INVENTOR
R. J. JAEGER, JR.
BY
ATTORNEY

Oct. 24, 1961  R. J. JAEGER, JR  3,005,874
LINE SWITCHING AND CONTROL SYSTEM
Filed May 4, 1959  8 Sheets-Sheet 2

INVENTOR
R. J. JAEGER, JR.
BY
ATTORNEY

STEPPING CIRCUIT

CHANNEL BUSY CIRCUIT

TRUNK-CHANNEL ASSOCIATION CIRCUIT

INVENTOR
R. J. JAEGER, JR.
BY
ATTORNEY

Oct. 24, 1961  R. J. JAEGER, JR  3,005,874
LINE SWITCHING AND CONTROL SYSTEM
Filed May 4, 1959  8 Sheets-Sheet 4
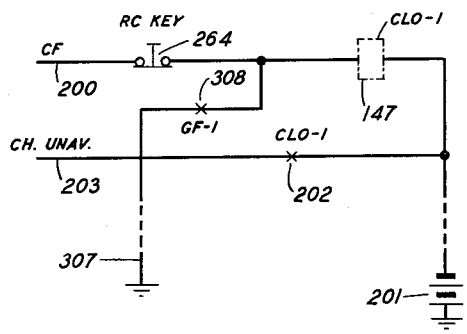
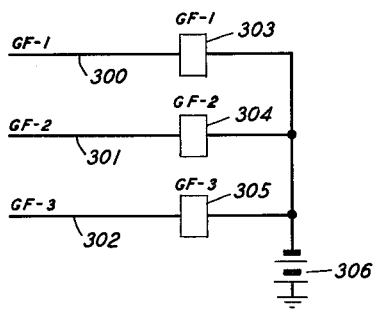
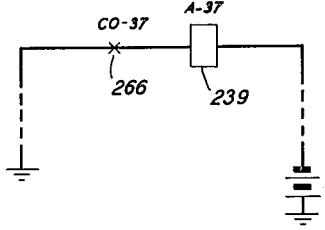
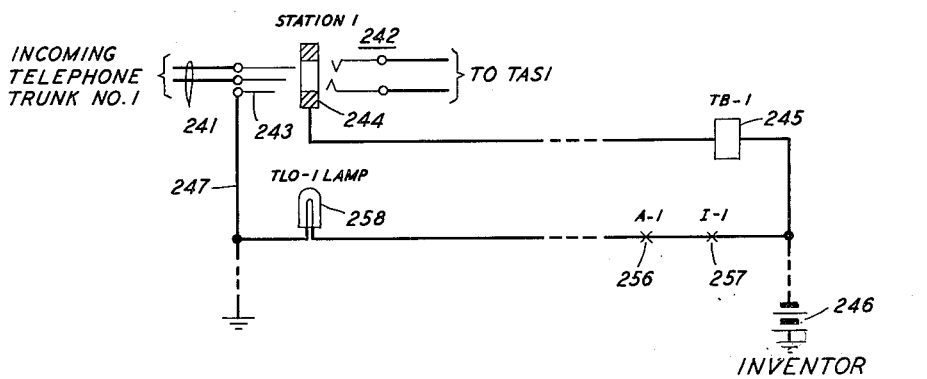
INVENTOR
R.J. JAEGER, JR.
BY
ATTORNEY Oct. 24, 1961  R. J. JAEGER, JR  3,005,874
LINE SWITCHING AND CONTROL SYSTEM
Filed May 4, 1959  8 Sheets-Sheet 5

INVENTOR
R.J. JAEGER, JR.
BY
ATTORNEY

Oct. 24, 1961     R. J. JAEGER, JR     3,005,874
LINE SWITCHING AND CONTROL SYSTEM

Filed May 4, 1959     8 Sheets-Sheet 6

INVENTOR
R. J. JAEGER, JR.
BY
R. O. Mintz
ATTORNEY

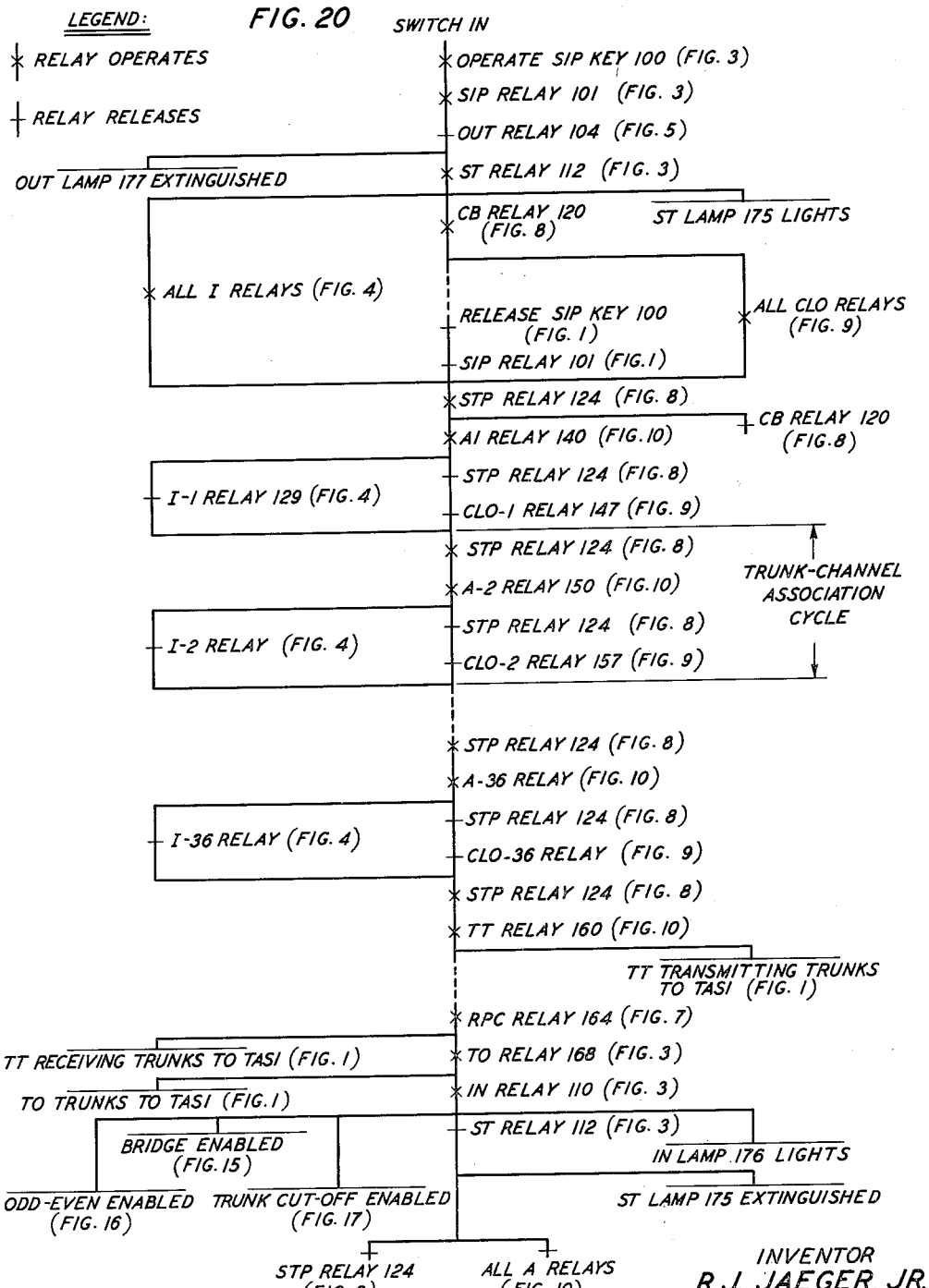

Oct. 24, 1961  R. J. JAEGER, JR  3,005,874
LINE SWITCHING AND CONTROL SYSTEM
Filed May 4, 1959  8 Sheets-Sheet 8
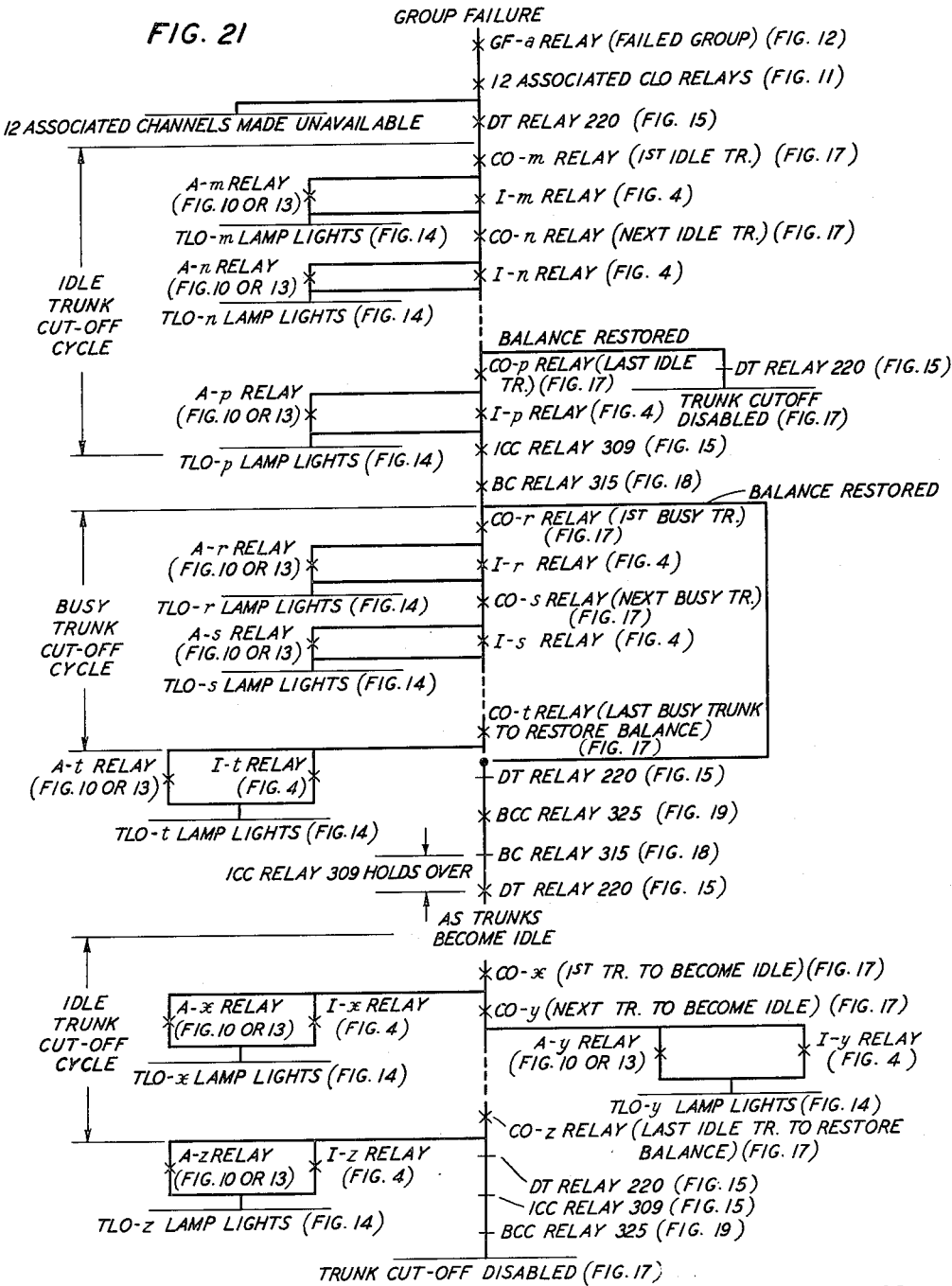
INVENTOR
R. J. JAEGER, JR.
BY
ATTORNEY United States Patent Office 3,005,874
Patented Oct. 24, 1961

3,005,874
LINE SWITCHING AND CONTROL SYSTEM
Richard J. Jaeger, Jr., West Hempstead, N.Y., assignor to Bell Telephone Laboratories, Incorporated, New York, N.Y., a corporation of New York
Filed May 4, 1959, Ser. No. 810,859
16 Claims. (Cl. 179—15)

This invention relates to multi-channel communication systems and, more particularly, to self-balancing line-switching circuits for use with such systems.

In communication systems employing long and expensive transmission facilities, such as transoceanic submarine cable facilities, it is economical to utilize terminal facilities which insure the maximum use of all of the available channel time. One such system is based on the statistical fact that conversations use the facilities, on the average, for less than one-third of the time. Therefore, by interconnecting the two parties only when speech is actually being transmitted, large savings in channel time may be effected. The terminal facilities which perform this function have been termed "time assignment speech interpolation" systems, or, more conveniently, TASI systems. One type of TASI system is disclosed in the copending application of A. R. Kolding and G. N. Packard, Serial No. 762,799, filed September 23, 1958.

By utilizing TASI facilities at the terminals of a transmission system, the capacity, in total number of conversations carried, can be doubled or even tripled. That is, each conversation channel of the transmission system, on the average, carries two to three separate conversations on a time separation basis. This is made possible by a switching arrangement which can disconnect a party when he ceases to talk and assign his transmission channel to another party who has just begun to talk. It is clear that this assignment of active talkers to idle transmission channels requires a large amount of control equipment.

In addition to the TASI facilities proper, however, means must also be provided to connect these facilities to the conventional telephone plant. That is, a transmission system which is normally capable of carrying a given number of conversations may suddenly be made capable of carrying a much larger number of conversations by the utilization of TASI facilities. In order to secure this transition in an orderly manner, the TASI facilities must be programmed ahead of time before the actual switch-in of TASI occurs.

It will be further noted that the ratio of the number of parties served to the number of transmission channels available, called the TASI advantage, is determined by the statistical probabilities of more parties wanting channels at the same time than there are channels available. In such a situation, one or more of the parties is "frozen out" in that he does not receive the use of the facilities. The lengths and numbers of such freeze-outs determine the quality of the transmitted speech.

It therefore is desirable to keep the freeze-outs below a selected maximum corresponding to the permissible degradation in the speech signals. Upon failures in individual ones of the transmission channels, however, the probability of freeze-outs will suddenly increase. Means must therefore be provided to reduce these probabilities back below the acceptable maximum.

It is an object of the present invention to control the connections to a time assignment speech interpolation system so as to fulfill the purposes of such a system.

It is a more specific object of the invention to interpose a time assignment speech interpolation system in a multi-channel transmission system without any substantial interruption in the conversations in progress over that transmission system.

It is another object of the present invention to maintain the degradation introduced by a time assignment speech interpolation system below a preselected maximum following failures in the transmission facilities being served.

It is a still more specific object of the present invention to automatically balance the number of talker lines entering a time assignment speech interpolation system against the number of available channels leaving the system so as to maintain a substantially constant level of transmission quality.

In accordance with the present invention, these and other objects are secured in one embodiment of the invention by a master control circuit which responds to signals of various kinds to control the connection of talker lines to the input of TASI facilities and to control the connection of transmission channels to the output of the TASI facilities.

More particularly, a control circuit is provided which, when initiated by the actuation of a manual switch, will automatically program a TASI system to duplicate talker line-transmission channel connections already existing in a through transmission system, interpose the TASI system with the duplicated connections in the transmission system when this programming is complete, and connect an additional number of talker lines to the TASI system to bring the TASI advantage up to the deserved level.

Having connected the TASI system into the transmission facility, the control circuit of the present invention continues to monitor the operation of the integrated system. If a failure should occur, for example, in a single transmission channel, the control circuit automatically compensates for its loss by removing the appropriate number of talker lines to maintain the freeze-out probabilities substantially constant. Due to the statistical nature of the system, trunks are removed at a ratio higher than the greatest TASI advantage ratio.

If a large number of transmission channel failures should occur simultaneously, the control circuit goes into an emergency switch-out program which balances this loss as soon as is possible, consonant with the principle of providing reasonable service to the largest number of parties.

One feature of the present invention resides in a selectable turn down sequence for the talker lines which automatically gives preference to the talker lines in any desired sequence. It is therefore possible to group the talker lines in accordance with this sequence and give the highest priority to the most essential lines.

Another feature of the invention resides in the full control these circuits give to operating personnel over the detailed operation of the TASI system. With such control, it is possible to make routine maintenance checks and emergency repairs to portions of the system while the remainder of the system is in operation.

These and other objects and features, the nature of the present invention and its various advantages, will be more readily understood upon consideration of the attached drawings and of the following detailed description of the drawings.

Figure 1:
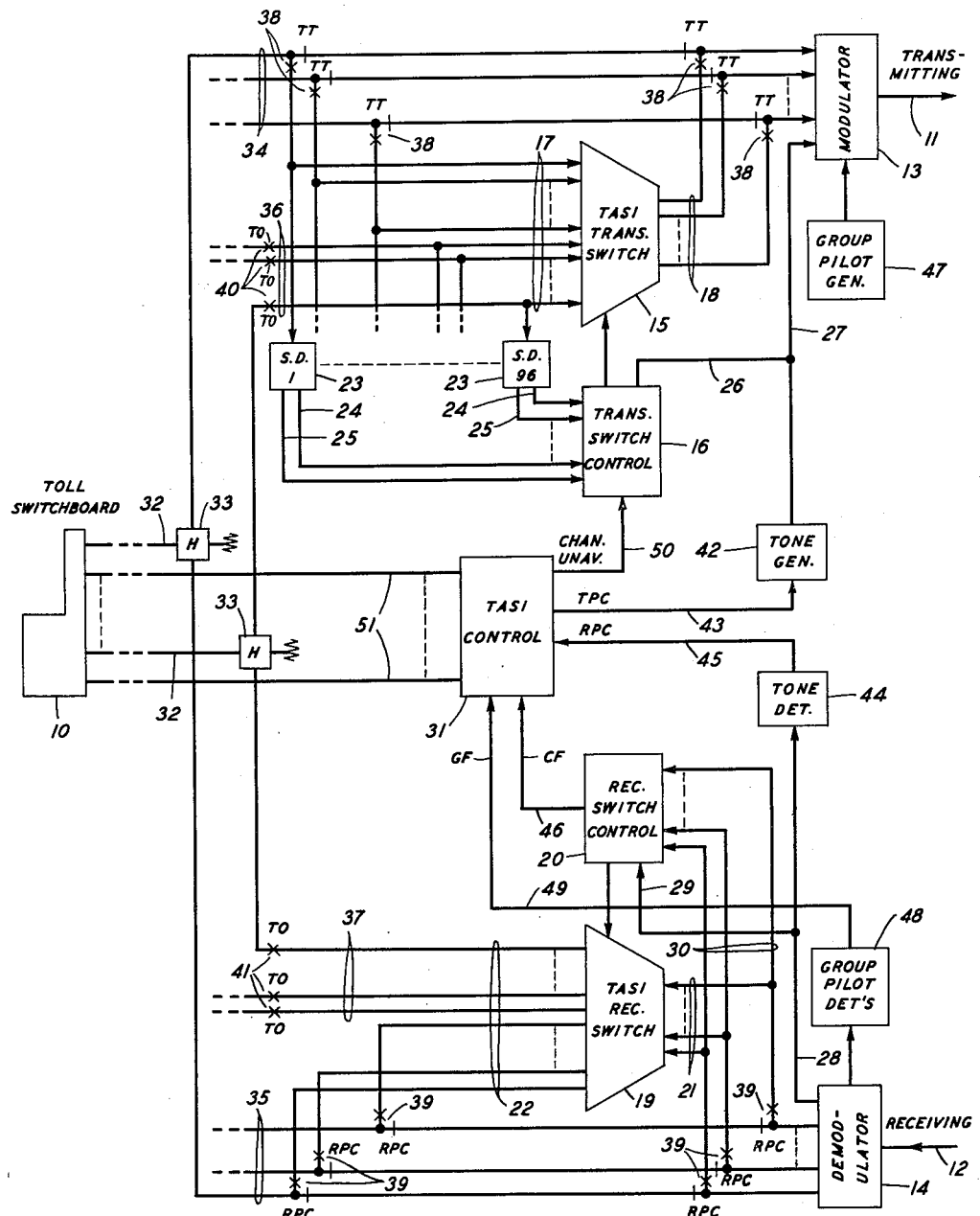
FIG. 1 is a schematic block diagram of one terminal of a transmission facility utilizing a time assignment speech interpolation system and controlled in accordance with the present invention.

FIGS. 3 through 10, taken together, comprise a circuit diagram of that portion of the control circuit which controls the switch-in of the time assignment speech interpolation system of FIG. 1 in accordance with the present invention;

FIGS. 11 through 19, taken together, comprise a circuit diagram of that portion of the control circuit which automatically balances the number of input lines to the time assignment speech interpolation system of FIG. 1 against the number of available transmission channels in accordance with the present invention;

FIG. 20 is a sequence chart which illustrates the details of the switch-in procedure carried on by the circuits of FIGS. 3 through 10; and FIG. 21 is a sequence chart which illustrates the details of the automatic balancing procedure carried on by the circuits of FIGS. 11 through 19.

Before proceeding with a detailed description of the drawings, it will be convenient to first take up a convention which has been followed for all of these drawings. The convention referred to, commonly known as the "detailed contact" convention, is based on the supposition that relay drawings will be easier to follow if the schematic diagrams do not attempt to associate all of the contacts of a relay with the relay structure which actually makes or breaks i.e, closes or opens, these contacts. This supposition is particularly valid where each relay winding controls a large number of contacts which are specifically related to totally different functions. The convention used herein follows the drawings analysis described by F. T. Meyer in "An Improved Detached-Contact Type of Schematic Circuit Drawing" published in Communications and Electronics Number 20, pages 505–513, September, 1955.

Figure 2:
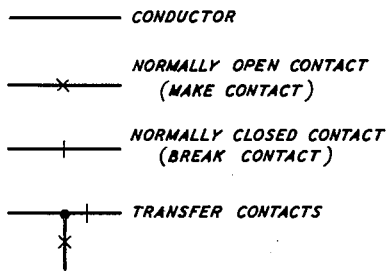
FIG. 2 is a legend of certain symbols useful in understanding the circuits disclosed in FIG. 1 and in the remaining figures of the drawings.

In accordance with the convention, a rectangle represents a relay winding and structure, excepting the contacts actuated by that structure. As illustrated in FIG. 2, a set of normally open, or make, contacts is shown by two short crossed lines through the center of which passes a solid line representing the connecting leads to the set of make contacts. A set of normally closed, or break, contacts is shown by a short line perpendicular to and crossing a solid line representing the connecting leads to the set of break contacts. A set of transfer contacts, i.e., a movable contact moving from one fixed contact to another fixed contact upon operation of the relay, is shown by two perpendicular lines, one terminating in the other. A make contact is drawn on one of the lines meeting at the intersection; a break contact is drawn on another of the lines meeting at the intersection; and no contact whatever is drawn on the third line. According to the convention, the lead with no contact representation is transferred from the lead including the break contact to the lead including the make contact upon actuation of the relay.

The capital letters and numerals or combinations thereof within each rectangle identifies the particular relay. Corresponding letters and numerals adjacent to a set of contacts identifies those contacts as being actuated by the relay bearing the same letters and numerals. Other circuit elements are shown in the usual form.

For ease in reading the drawings, the relays have normally been shown as operated from a negative voltage source, illustrated schematically as a battery, located to the right of the relay winding and connected directly thereto. The ground for this negative voltage supply is represented as a bus to the left of the relay windings. The combinations of make, break and transfer contacts which complete the energization of a relay winding are shown on conductors extending between the ground bus and the relay winding.

*General*

Referring specifically to FIG. 1, there is shown a schematic block diagram of one terminal of a multi-channel communication system employing time assignment speech interpolation. In general, the system of the present invention serves to connect a plurality of telephone trunks terminating in a toll switchboard 10 to an equal plurality of remote telephone trunks through two, one-way multi-channel transmission facilities 11 and 12. Transmission facilities 11 and 12 may comprise, for example, two transoceanic telephone cables, one for each direction of transmission. By means of modulating equipment 13, a large number of telephone transmission channels may be carried by the single facility 11 to a remote location, possibly on another continent. Similarly, transmission channels from the remote location, carried by transmission facility 12, are separated by local demodulating equipment 14.

The function of the TASI facilities in the above-described communication system is to allow the transmission facilities 11 and 12 to carry the speech derived from a far larger number of telephone trunks. In a communication system providing thirty-six transmission channels, for example, almost one hundred simultaneous telephone conversations, arriving over separate telephone trunks, may be transmitted without significant interference. This is possible due to the large proportion of silent periods during an average telephone conversation. Pauses between sentences, words, and even syllables, as well as pauses while the other party is talking, may be made use of for the transmission of speech fragments from a different talker to a different listener. Only about one-third of the total conversation time is required to transmit the actual speech signals and hence up to three times as many talkers can be accommodated on a transmission facility by utilizing speech interpolation techniques.

In order to interpolate speech on a time division basis, it is necessary to be able to connect any talker trunk to any transmission channel for at least the period of time required to transmit a speech fragment. TASI transmitting switch 15 is just such a facility. Transmitting switch 15, under the control of switch control circuit 16, can connect any one of a large number of telephone transmitting trunks 17 to the input of any one of a lesser number of transmission channels 18. Similarly, TASI receiving switch 19, under the control of switch control circuit 20, can connect the output of any one of a large number of transmission channels 21 to any one of a far larger number of telephone receiving trunks 22. The details of one type of TASI switch and control circuit is disclosed in the aforementioned copending application of A. R. Kolding and G. N. Packard, to which the reader is referred for these details.

As disclosed in this copending application, each telephone transmitting trunk is monitored by a speech detector 23 having two output leads 24 and 25. Output lead 24, termed the active output lead, is energized only when the connected telephone trunk is actually carrying speech. Output lead 25, termed the inactive or idle output lead, on the other hand, is energized only when the connected telephone trunk is not actually carrying speech. Speech detectors 23 therefore comprise instantaneous detectors of the activity on each of the transmitting telephone trunks. Such speech detectors are well-known in the art and, since they form no part of the present invention, will not be further described here.

The active and inactive output leads from speech detectors 23 are introduced into switch control circuit 16. Utilizing this active-inactive information, control circuit 16 is able to direct the TASI switch 15 to connect each active trunk to an available transmission channel. Since these connections are continually changing, however, a control lead 26 from the switch control circuit 16 is connected to an auxiliary control channel 27. Control lead 26 carries much of the information concerning the switching function which is necessary at the remote receiving terminal to duplicate the connections and thus connect each local talker to the proper remote listener.

At the bottom of FIG. 1, a corresponding control channel 28 is connected by way of control lead 29 to the receiving switch control circuit 20. In this way, receiving switch control circuit 20 receives the information from the remote transmitting terminal necessary to duplicate the trunk-channel connections at the remote transmitter and hence connect each remote talker to the proper local listener. In addition, monitoring leads 30, connected to the individual outputs of transmission channels 21, are also introduced into control circuit 20 to supplement the control channel 28 for receiving connection information.

Control channels 27 and 28 may be combined with the speech channels on facilities 11 and 12 as shown, or may comprise entirely separate transmission lines. In either event, it is apparent that the control channels should have a high degree of dependability and, preferably, each should have an alternate standby facility which can continue the control function in case of failures.

It will be noted that the TASI transmitting and TASI receiving apparatus comprise essentially separate and distinct transmission systems. The TASI transmitting switch 15 sets up connections in response to the activity of local talkers and these connections are duplicated at the remote TASI receiving apparatus, not shown. Similarly, a remote TASI transmitting switch, not shown, sets up connections in response to the activity of remote talkers and these connections are duplicated in the local receiving switch 19. Transmission facility 11 carries interpolated speech in one direction and transmission facility 12 carries interpolated speech in the reverse direction. These transmissions and the associated switching functions are not synchronized and, indeed, have no correspondence other than the identification of each talker-listener pair with particular transmitting and receiving trunks. Speech transmitted in one direction between such a pair, for example, need not occupy a channel or a time period corresponding to that occupied by speech transmitted in the other direction between the same pair.

The above-described arrangements are taken up in more detail in the above-mentioned copending application of A. R. Kolding and G. N. Packard. These arrangements cover all of the essential features of a time assignment speech interpolation system. In accordance with the present invention, means are also provided for connecting these TASI facilities to the conventional telephone plant. A TASI control circuit 31 is provided for this essential function. To better understand the operation of the TASI control circuit, it is convenient to outline the conventional telephone facilities.

The transmission facilities 11 and 12 would, in the conventional telephone plant, be capable of carrying a fixed number of telephone conversations equal in number to the transmission channels made available by the facilities. These conversations would, for example, be derived from a toll switchboard 10 having two-way telephone lines 32 terminated in hybrid structures 33. Hybrids 33 serve to split these two-way conversations into two one-way speech signals, transmitted speech signals on transmitting trunks 34 and received speech signals on receiving trunks 35. The transmitted speech signals would be connected directly to transmission facility 11 by way of modulating equipment 13 and the received speech signals would be derived directly from transmission facility 12 by way of demodulating equipment 14.

When TASI is used in the transmission system, this same fixed number of telephone trunks would continue to receive service. These trunks 34 and 35 have therefore been termed "Through and TASI" trunks or, more simply, TT trunks.

In addition to the TT trunks, however, the use of TASI makes it possible to utilize transmission facilities 11 and 12 for serving a large number of added trunks 36 and 37. Since these trunks can be served only with the use of TASI, they have been termed "TASI Only" trunks, or TO trunks.

In accordance with the present invention, control circuit 31 connects the TASI facilities into the transmission system while conversations are in progress on the TT trunks 34 and 35 without discernible interruption of these conversations. This is accomplished by programming the TASI switches 15 and 19 to duplicate the direct TT trunk connections and then to remove these direct connections and substitute the connections through the TASI switches. These connection transfers are accomplished by transfer contacts 38 at the transmitting switch 15 and transfer contacts 39 at the receiving switch 19.

Once the TT trunks are connected through the TASI switches, at the remote terminals as well as at the local terminals, it is possible to connect the TO trunks to the TASI switches. This is accomplished by closing make contacts 40 for the transmitting trunks and make contacts 41 for the receiving trunks. In order to coordinate the two ends of the communication system for the switching of TO trunks, a tone generator 42 is provided to generate a signaling tone under the control of lead 43 from TASI control circuit 31. Lead 43 is energized after the transfer of the TT trunks to TASI switch 15. Tone generator 42 is connected directly to control channel 27 and therefore transmits this signal over the control channel. This tone is detected at the remote terminal and permits switching of the receiving end of the TT and TO trunks at the remote terminal. Lead 43 has been labeled TPC for "Transmit Preparation Complete" (TPC).

A TPC signal from the remote terminal, indicating the completion of the TT trunk switching at the remote terminal, is also indicated by a signaling tone. This tone is transmitted on control channel 28 and detected in detector circuit 44. On detecting this tone, detector circuit 44 energizes lead 45. Lead 45, labeled RPC for "Receive Preparation Complete," is connected to control circuit 31 and permits the transfer of the TT receiving trunks to the TASI equipment by transfer contacts 39, and permits the TO trunk switching to take place.

In further accord with the present invention, means are provided for not only connecting the TASI facilities into service, but also for automatically adjusting the trunk-channel ratio in case of channel failures. In general, these channel failures can be either one of two types, individual channel failures or channel group failures.

Individual channel failures can result from failures in the individual channel transmitting equipment or from failures in that portion of the TASI control circuits pertaining to the individual channel. These failures can be detected in receiving switch control circuit 20 which monitors all of the received channels 30. This may be accomplished, for example, by means of pilot tones outside of the speech band but within the channel transmission band. Another form of channel failure detecting circuit suitable for this purpose is disclosed in the copending application of R. J. Fulmer Serial No. 815,578, filed May 25, 1959. In any event, these individual channel failures are reported to TASI control circuit 31 from switch control circuit 20 by way of control line 46, labeled CF for channel failures. Failures in the transmitting channels are, of course, detected by similar equipment at the remote terminal and reported to the remote TASI control circuit.

When modulating a large number of transmission channels onto a single transmission facility, it is sometimes the practice to divide these channels into groups, modulate the channels of each group together to form a group signal, and then to modulate the groups themselves together to form a single frequency-multiplexed signal suitable for transmisison on the transmission facility. If such is the case in the system of FIG. 1, in addition to individual channel failure, there is also the possibility of failures in the group modulating equipment which result in the loss of an entire group of transmission channels.

A group pilot generator 47 supplies a pilot signal for each group signal generated in modulating equipment 13. This pilot signal is transmitted along with the speech signals but is in a frequency slot outside of all of the speech signals. These group pilot signals may be used at the remote receiving terminal to detect group failures.

Group failures occurring in the receiving transmission facility 12 are likewise detected by a bank 48 of group pilot detectors which monitor the group pilot signals received at demodulating equipment 14. The group pilot frequencies thus detected are, of course, generated in a group pilot generator at the remote transmitting terminal. The channel group failures thus detected are reported to TASI control circuit 31 by way of control line 49, labeled GF for group failures.

When an individual channel or a group of channels fail, the TASI switch control circuits must be apprised of this situation so that they do not connect active trunks to these now defunct channels. Control line 50 from TASI control circuit 31 to transmitting switch control circuit 16 performs this function. In response to the failure of a channel, as indicated by control lines 46 or 49, TASI control circuit 31 signals switch control circuit 16 over line 50 to cease connecting active talkers to that channel. The transmitting channel is thereby effectively removed from service.

The receiving switch control circuit at the remote terminal is informed of the failure of the transmitting channel by signals on the control channel 28 and removes the corresponding receiving channel from service in the same way. Thus, for each channel failure, whether in the transmitting circuits or in the receiving circuits, both the transmitting and the receiving channels are removed from service.

Having removed the faulty channels from service, it will be apparent that the load factor on the remaining channels has changed. Since the TASI system is designed to transmit high quality speech signals only with the selected load factor, this load factor must be restored to retain the quality of the speech signals. In accordance with the present invention, this load factor is automatically restored by TASI control circuit 31. By way of control leads 51, TASI control circuit 31 notifies the toll switchboard 10 that specific ones of the telephone trunks must be turned down in order to restore the load factor. Simultaneously these trunks are locked-out of the TASI equipment by artificially marking their speech detectors as inactive. In this way, the level of transmission quality is restored to the desired value.

The details of the TASI control circuit 31, by which the various objects of the invention are attained, are disclosed in FIGS. 3 through 19. FIGS. 3 through 10 are the circuit details of that portion of control circuit 31 which controls the switch-in function. FIGS. 11 through 19 are the circuit details of that portion of control circuit 31 which controls the automatic trunk-channel balance function. These two functions are basic and are essential to the proper operation of the integrated communication system. Other less essential functions may be readily incorporated into these circuit arrangements by anyone with skill in the art. Some of them will be mentioned in the appropriate places to illustrate the flexibility of the control system of the present invention.

The use of the detached contact convention has resulted, in many cases, in contacts of a particular relay being shown in a different figure than the relay structure which operates those contacts. For this reason, and to render the description of these figures convenient and meaningful, no attempt will be made to take up in detail each figure in its entirety in the order in which they appear. Instead, the figures will be described from the viewpoint of the overall basic function which they cooperate to effect. This approach, together with the functional sequence charts of FIGS. 20 and 21, it is believed, will expedite the description and, at the same time, render it more meaningful.

In the following description, it will be assumed that the transmission facilities 11 and 12 in FIG. 1 are each capable of simultaneously carrying thirty-six speech transmission channels as well as at least one control channel. This assumption is for convenience only and should not be taken as limiting. Similarly, it will be assumed that the TASI facilities will make it possible to serve ninety-six telephone trunks with these thirty-six transmission channels giving an initial trunk-to-channel ratio of 2.67. As discussed above, this ratio is well within the capabilities of a TASI system of the assumed size.

*Switch-in-procedure*

Assuming, then, that it is desired to connect the TASI facilities into the transmission system of FIG. 1 following a failure or a routine maintenance check, or in an original installation, a semi-automatic switch-in procedure is followed. In the illustrative embodiment shown, this switch-in procedure must be manually initiated separately for each terminal of the transmission facilities with the equipment hereafter described. Using the circuit disclosed in the copending application of B. Blakely, Jr., Serial No. 730,088, filed April 22, 1958, however, this switch-in could be initiated at only one terminal and the automatic signaling circuits there disclosed could be used to initiate switch-in at the remote terminal. For the purposes of the illustrative embodiment, it will be assumed hereafter that the circuits disclosed are duplicated at each terminal and that the circuit operations described take place at both of these terminals.

Figure 3:
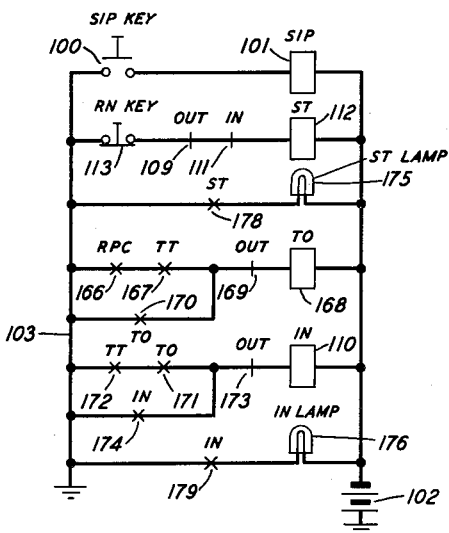
Figure 5:
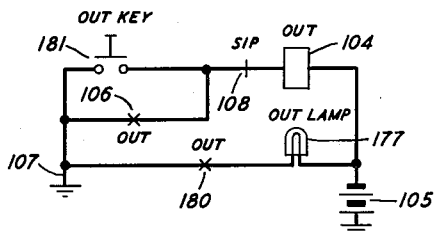

Attendant personnel, by means, for example, of a telephone circuit interconnecting the two terminals, decide to effect a switch-in of the TASI facilities. Thereupon they each press a "Switch-in Preparation" (SIP) key, such as disclosed in FIG. 3, at their respective terminals. The operation of these keys need not be synchronized in any manner since the circuits will automatically await the completion of the necessary sequences at the other terminal before completing the switch-in. Following the depression of the SIP key, the remainder of the switch-in operation is completely automatic and takes place as follows:

It can be seen in FIG. 3 that the depression of the SIP key 100 energizes SIP relay 101 by completing the connection between battery 102 and ground bus 103. While the TASI facilities are out of service, an OUT relay 104 in FIG. 5 is energized from battery 105 through its own make contact 106 to ground bus 107. The SIP break contact 108 releases OUT relay 104, thus closing break contact 109 in FIG. 3. Since the TASI facilities are out of service, IN relay 110 is released and hence IN break contact 111 is closed. Start (ST) relay 112 is therefore operated through normally closed "Release-to-Normal" (RN) switch 113. SIP key 100 is of the non-locking type and therefore releases SIP relay 101 after a momentary operation.

In order to control the switch-in and other supervisory functions, each channel of the transmission system has a "Channel Lock-Out" (CLO) relay associated therewith. There are therefore provided thirty-six CLO relays, one for each of the thirty-six transmission channels. The CLO relay winding for channel 1 is illustrated in FIG. 11. The operation of any one of the CLO relays indicates that the associated channel is for some reason not available for speech interpolation. The means in which these CLO relays are operated, and the effect thereof, will be more fully described below.

Figure 4:
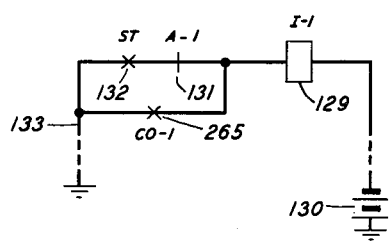
Figure 6:
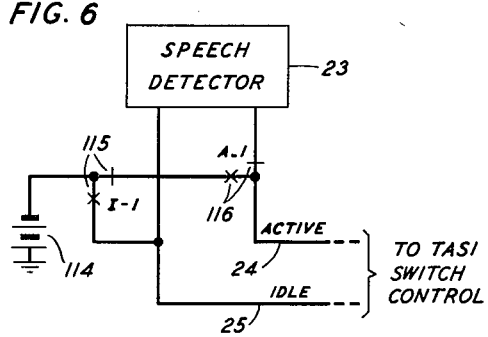

Similarly, each trunk coming into the transmission system, the TO trunks as well as the TT trunks, has associated therewith an "Active" or A relay, an "Idle" or I relay, a "Trunk Busy" or TB relay and a "Cut-Off" or CO relay. Each A relay serves to artificially mark its associated trunk as actively carrying speech fragments and hence cause the TASI facilities to search for an available transmission channel to which this trunk may be assigned. This is accomplished as shown in FIG. 6 by connecting a battery 114 to the active output lead 24 of the associated speech detector 23 through transfer contacts 116. Similarly, each I relay serves to artificially mark its respective trunk as not carrying speech and hence cause the TASI facilities to disconnect this trunk from the transmission channels. As shown in FIG. 6, this is accomplished by connecting battery 114 through transfer contacts 115 to idle output lead 25. One such I relay is illustrated in FIG. 4.

It will be noted that when both the A and the I relays of a particular trunk are operated, the trunk is marked as idle. It will also be noted that when both the A and the I relays of a particular trunk are released, the speech detector will operate in a normal fashion to report the actual speech on the trunk. Hence the A and the I relays are all normally released.

Each TB relay serves to indicate that the associated trunk is connected through to a telephone subset. As shown in FIG. 14, the TB relay is operated when an incoming trunk is plugged into the station jack at the toll switchboard. Hence, the TB relay is operated when the telephone trunk is connected to the system, regardless of the actual speech activity on that trunk.

Figure 10:
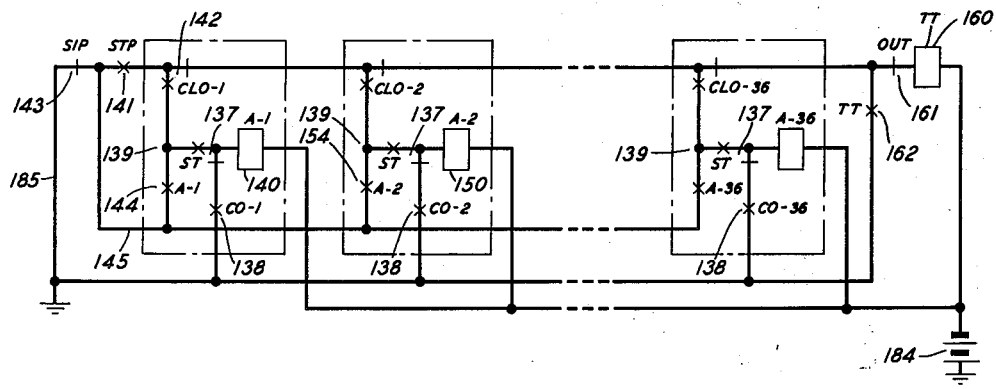

Each CO relay serves as a means to automatically remove the associated trunk from service. The CO relays are illustrated in FIG. 17, one for each of the ninety-six trunks. As shown in FIGS. 4 and 10, respectively, the operation of each CO relay causes the A and I relays associated with the same trunk to operate, thus marking the trunk as inactive and denying it service in the TASI equipment. As shown in FIG. 14, the operation of the A and I relays causes a lamp at the toll switchboard to light up. This lamp, the "Trunk Locked Out" or TLO lamp, indicates to the switchboard operator that the trunk is no longer receiving service and the incoming telephone trunk should be removed from the associated station jacks. The operation of these circuits will be more fully described below.

Figure 8:
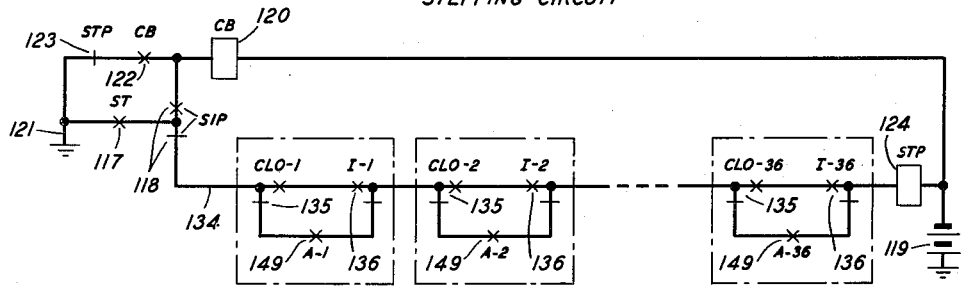

Turning now to the Stepping Circuit of FIG. 8, it can be seen that the closing of ST make contact 117 and the transfer of SIP transfer contacts 118 serve to apply current from battery 119 through the "Channel Busy" or CB relay 120 to ground bus 121. The CB relay 120 locks through its own make contact 122 and the break contact 123 of "Stepper" (STP) relay 124 to ground bus 121.

Figure 9:
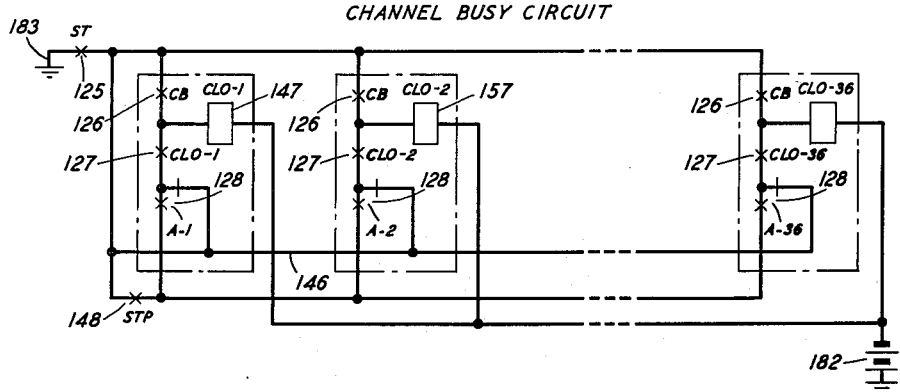

In the "Channel Busy" Circuit of FIG. 9, the operation of the ST relay 112 closes ST make contact 125. Operation of the CB relay 120 immediately follows to close CB make contacts 126. There is provided one CB make contact 126 for each of the thirty-six CLO relays and they serve to operate the CLO relays from battery 182 through ST make contact 125 to ground bus 183. Each of the CLO relays locks through its own make contact 127 and through the break path of the A transfer contacts 128 of the associated A relays to ground bus 146. As shown in FIG. 4, each of the I relays, such as the I-1 relay 129, is operated through the path from battery 130 through a break contact of the associated A relay, such as A-1 break contact 131, and ST make contact 132 to ground bus 133.

It can be seen that the operation of the SIP key 100 causes a definite sequence of operations to take place. This sequence can be better seen in the sequence chart of FIG. 20. As shown in the switch-in sequence chart FIG. 20, the operation of SIP key 100 causes SIP relay 101 to operate. Operation of the SIP relay 101 releases OUT relay 104 and allows ST relay 112 to operate. The operation of ST relay 112 causes CB relay 120 to operate and thereby operate all of the CLO relays. The operation of the ST relay 112 also causes all of the I relays to operate. When the SIP key 100 is released, the I relays are locked under the control of ST make contacts 132 and break contacts 131 of the associated A relays. Similarly, when SIP key 100 is released, the CLO relays are locked under the control of their own make contacts 127 and the unoperated transfer contacts 128 of the associated A relays. The remainder of this description is summarized in the sequence chart of FIG. 20 and may easily be followed there.

Release of SIP key 100 releases SIP relay 101 in FIG. 3 and transfers ground in FIG. 8 from CB relay 120 to stepping conductor 134. Since all of the CLO relays are operated, and since all of the I relays are operated, CLO transfer contacts 135 and I transfer contacts 136 complete the circuit through stepping conductor 134 to STP relay 124. At this time STP relay 124 operates. STP breaks contact 133 releases CB relay 120. The CLO relays in FIG. 9 remain operated, however, through their own make contacts 127 and the A transfer contacts 128.

Turning now to the Trunk-Channel Association Circuit of FIG. 10, it can be seen that ST transfer contacts 137 transfer control of the A relays from CO make contacts 138 to junction 139. Since all of the CLO relays are operated, junction 139 for the A-1 relay 140 is connected to STP make contact 141 through CLO-1 transfer contacts 142. Transfer contact 142 simultaneously disconnects STP make contact 141 from the remainder of the A relay circuits. Following the release of SIP relay 101, SIP break contact 143 closes. On the operation of STP relay 124, STP make contact 141 closes and operates A-1 relay 140, from battery 184 to ground bus 185. A-1 relay 140 locks through A-1 contact 144 to ground bus 145.

In order to understand this and the following sequences, it should be understood that the operation of all of the I relays has already made all of the TT trunks look inactive to the TASI equipment. The operation of all of the CLO relays has made all of the channels unavailable to the TASI equipment. When A-1 relay 140 operates as above described, the A-1 break contact 131 in FIG. 4 opens to release the I-1 relay 129. With the A-1 relay 140 operated and the I-1 relay 129 released, the first channel appears to the TASI equipment as an active channel (FIG. 6).

The operation of the A-1 relay 140 transfers the control of the CLO-1 relay 147 in FIG. 9 from ground bus 146 to STP make contact 148. The release of the I-1 relay opens stepping conductor 134 in FIG. 8 and releases the STP relay 124. STP make contact 148 therefore reopens and releases CLO-1 relay 147.

It can be seen that the operation of the A-1 relay 140 has caused the TASI equipment to start to look for an available channel for the first trunk to be connected to. All of the channels had been made unavailable, however, by the operation of all of the CLO relays. Release of STP relay 124, however, releases CLO-1 relay 147 and allows the first channel to become available to the TASI equipment. At this time, the TASI equipment assigns the first trunk to the first channel.

When CLO-1 relay 147 releases, A-1 make contact 149 in FIG. 8 provides a by-pass around CLO-1 transfer contacts 135 and I-1 transfer contacts 136 and reoperates STP relay 124. Since CLO-1 relay is released and CLO-2 relay is still operated, A-2 relay 150 is operated through CLO-2 transfer contacts 151, CLO-1 transfer contacts 142, STP make contact 141 and SIP break contact 143. A-2 relay 150 locks through its own make contact 154 to ground bus 145. Simultaneously, an A-2 break contact similar to A-1 break contact 131 in FIG. 4 releases the I-2 relay. At this time the second trunk is marked as active.

Operation of A-2 relay 150 transfers control of the CLO-2 relay 157 from ground bus 146 to STP make contact 148. Release of the I-2 relay interrupts ground conductor 134 in FIG. 8 at I-2 transfer contacts 136 and releases the STP relay 124. STP make contact 148 opens and releases CLO-2 relay 157. At this time, the second trunk is made available for connections. The TASI equipment therefore connects the second trunk to the second channel.

When CLO-2 relay 157 releases, A-2 make contact 149 in FIG. 8 provides a by-pass around CLO-2 transfer contacts 135 and I-2 transfer contacts 136 to reoperate STP relay 124.

It can be seen that the circuits of FIGS. 8, 9 and 10 cooperate to successively mark all of the TT trunks as active and, following this marking of each TT trunk, makes the corresponding channel available for connection. In this way, the TASI equipment is forced to connect the first trunk to the first channel, then the second trunk to the second channel, then the third trunk to the third channel, and so forth until all thirty-six of the TT trunks are connected by the TASI equipment to the thirty-six channels on a one-for-one basis. It is to be understood, however, that during this trunk-channel association sequence, the TASI equipment is actually only connecting trunk and channel stubs together rather than the actual circuits. As can be seen in FIG. 1, these stubs are not connected to the actual trunks and channels until the TT transfer contacts 38 and the RPC transfer contacts 39 are operated.

When the last or thirty-sixth trunk has been connected to the thirty-sixth channel by the operation of the Trunk-Channel Association Circuit of FIG. 10, all of the A relays of the TT trunks have been operated and all of the I and CLO relays of the TT trunks released. On the next operation of STP relay 124, TT relay 160 operates through OUT break contact 161 and STP make contact 141 and locks through its own make contact 162 to ground. TT relay 160 operates TT transfer contacts 38 and 39 in FIG. 1 to substitute the connections of the trunks and channels through TASI switches 15 and 19 for the direct connections. TT relay 160 is a fast operating relay and therefore makes this transfer without noticeable effect to the connected talking parties.

While the TASI equipment at the local terminal is associating trunks and channels in response to the above-described control circuits in the transmitting switch, these connections are reported to the remote TASI receiving equipment over the control channel 27. One means for accomplishing this reporting is disclosed in the aforementioned copending application of A. R. Kolding and G. N. Packard. Hence the connections set up at the local terminal transmitting switch are duplicated at the remote terminal receiving switch.

Figure 7:
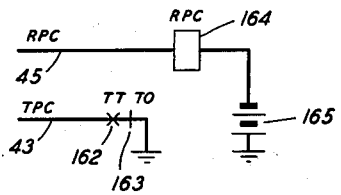

Turning to FIG. 7, it can be seen that the operation of TT relay 160 closes TT make contact 162 to apply ground through TO break contact 163 to "Transmit Preparation Complete" (TPC) lead 43. This signal on lead 43 energizes tone generator 42 in FIG. 1 to transmit a signal over control channel 27 to signify that the switch-in preparation is complete. This tone is detected at the remote terminal and used to enable complete switch-over to full TASI operation. A similar tone is generated at the remote terminal when switch-in preparation is complete at that terminal. This tone from the remote terminal is detected in tone detector 44 and used to apply a ground to RPC ("Receive Preparation Complete") lead 45 to operate RPC relay 164 from battery 165.

The operation of RPC relay 164 transfers RPC transfer contacts 39 in FIG. 1 to connect the receiving channels through TASI switch 19 to the TT receiving trunks 35. At the same time, RPC make contact 166 in FIG. 3 is closed. Since TT relay 160 has operated, TT make contact 167 is also closed. TO relay 168 therefore operates through OUT break contact 169 and locks through TO make contact 170. The operation of TO relay 168 closes TO make contacts 40 and 41 in FIG. 1 to connect the "TASI Only" trunks to the TASI switches 15 and 19, respectively. The TASI equipment is now in full operation.

The operation of TO relay 168 closes TO make contact 171 and IN relay 110 operates through TT make contact 172 and OUT break contact 173, locking through IN make contact 174. The operation of IN relay 110 opens IN break contact 111 and releases ST relay 112. The release of ST relay 112 opens ST make contacts 117 and 125 in FIGS. 8 and 9, respectively, to disable these circuits. Simultaneously, ST transfer contacts 137 in FIG. 10 transfer control of the A relays to CO make contacts 138. Since the CO relays are all released, all of the A relays release. The circuit of FIG. 10 is therefore disabled until ST relay 112 again operates on another switch-in preparation. All of the switch-in circuits have therefore been released to normal.

It will be noted that ST relay 112 is equipped with a signal lamp 175, IN relay 110 is equipped with a signal lamp 176 and OUT relay 104 is equipped with a signal lamp 177. These lamps indicate to attendant personnel that the TASI equipment is in service, out of service, or being prepared for a switch-in. They are lighted by ST make contact 178, IN make contact 179 and OUT make contact 180, respectively.

It will be further noted that the energization path of ST relay 112 goes through a normally closed "Restore to Normal" switch 113. Operation of switch 113 at any time during the switch-in preparation will release ST relay 112 and restore the switch-in control circuits to normal.

It will be recognized that many of the relay structures heretofore described are required to operate a large number of contacts. It is to be understood that one or more auxiliary relays may be provided, under control of the relays described, to operate the required contacts, if necessary. It is only for the purpose of simplicity that it has been assumed that each relay described operates all of the associated contacts.

In order to remove the TASI equipment from service once it is in service, it is only necessary to close normally open OUT switch 181 in FIG. 5. This will operate OUT relay 104 which, in turn, will release ST relay 112 at OUT break contact 109, release TT relay 160 (FIG. 10) at OUT break contact 161, release TO relay 168 at OUT break contact 169, and release IN relay 110 at OUT break contact 173. In this way, the TT and the TO trunks are removed from the TASI equipment and the TT trunks connected directly to the transmission channels. The system can then operate as a conventional transmission system.

It is clear that OUT relay 104 could be operated automatically in response to a major failure in the TASI equipment or in the transmission medium. One such automatic removal circuit is disclosed in the aforementioned copending application of B. Blakely, Jr.

Once the TASI facilities are in service, it may happen that one or more of the individual transmission channels may become inoperative, either because of a failure in the transmission medium, the multiplexing equipment or the per channel TASI equipment. In such an event, it may become desirable to continue speech interpolation on the remaining channels rather than cutting out the TASI equipment entirely. The following description covers circuit arrangements to make this operation possible.

*Individual channel failures*

As shown in FIG. 1, individual channel failures are reported to the TASI control circuit 31 on line 46 from receiving switch control circuit 20. These failures are detected by pilot tone failures or as disclosed in the aforementioned copending application of R. J. Fulmer. These failures are reported on thirty-six separate leads, one for each of the transmission channels, in the form of a ground applied to the lead corresponding to the channel which has failed.

In FIG. 11, this ground would be applied to CF conductor 200 or a similar conductor and would operate on associated CLO relay such as CLO-1 relay 147, from a battery 201 through normally closed RC key 264. The operating circuits for only one CLO relay have been illustrated in FIG. 11 since they are all similar. Furthermore, since CLO-1 relay 147 has been illustrated in the circuit of FIG. 9, it is represented in FIG. 11 by a dashed rectangle. It is to be understood that CLO-1 relay 147 may be operated over the circuit of FIG. 9 or the circuit of FIG. 11. Normally, however, the circuit of FIG. 9 is operative only during switch-in preparation (when ST relay 112 is operated) and the circuit of FIG. 11 is operative only after switch-in is complete and the TASI facilities are in service.

Assuming, then, that a failure occurs in channel 1 of the transmission system, CLO-1 relay 147 is operated as shown in FIG. 11. The operation of CLO-1 relay 147 closes CLO-1 make contact 202 and applies a potential from battery 201 to a "channel unavailable" lead 203. As shown in FIG. 1, this "channel unavailable" signal is applied to transmitting switch control circuit 16 and is used therein to mark the failed channel, channel 1, as unavailable to the TASI equnipment. This channel is therefore no longer used to transmit interpolated speech. The remote receiving equipment is apprised of this event over the control channel and makes the corresponding receiving channel unavailable. In this way, a pair of channels, one in one direction and the other in the opposite direction, are removed from service. It is necessary to remove both these channels even though a failure may have occurred in only one of them to preserve the same trunk-channel ratio for both directions of transmission.

Having effectively removed the faulty channel from service, it is noted that the load factor on the remaining channels has changed. This reduction in the number of channels in which speech may be interpolated increases the probabilities that channels will not always be available when required. More numerous and longer "freeze-outs" may therefore be expected to occur and the transmitted speech degraded accordingly. It is desirable, however, to maintain the same quality of speech even after such a channel failure. The circuits to be described hereafter perform this function.

Figure 15:
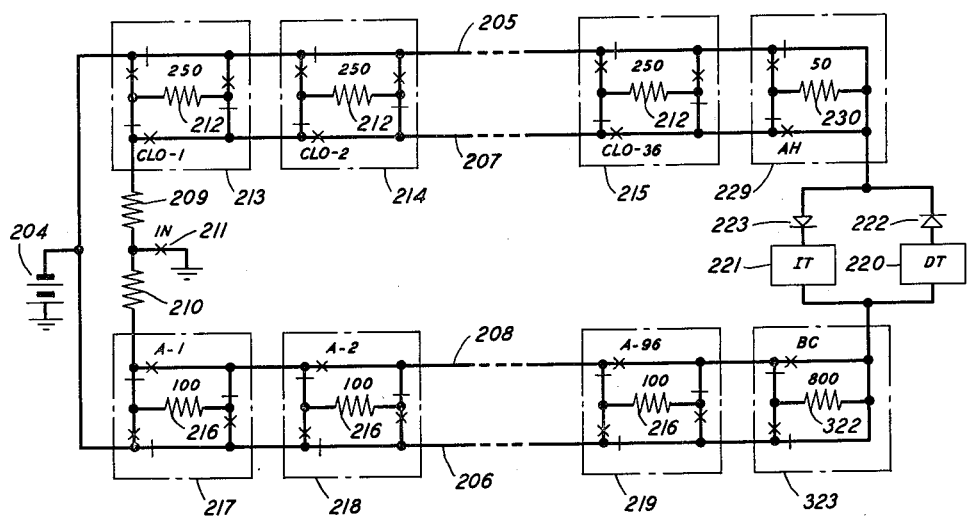

In FIG. 15 there is shown a bridge circuit for comparing the number of failed channels with the number of locked out trunks and for producing a signal when the ratio between these numbers exceeds or falls below a preselected value. A battery 204 applies a potential to two arms 205 and 206 of the bridge circuit of FIG. 15. Conductors 207 and 208 form the other two arms of the bridge and are returned through balancing resistors 209 and 210, respectively, and IN make contact 211 to ground. A plurality of resistors 212, one for each transmission channel, are normally connected in series in arm 207 but are each capable of being inserted in series with arm 205 upon the operation of associated relay contacts. Thus the contacts within dashed rectangle 213 are operated by CLO-1 relay 147 and serve, by means of the transfer contacts illustrated, to transfer the first resistor 212 from arm 207 to arm 205 and to substitute a direct connection in arm 207. Similarly, the transfer contacts within dashed rectangle 214 are operated by CLO-2 relay 157 and transfer the second resistor 212 from arm 207 to arm 205, and so forth, to the transfer contacts within dashed rectangle 215 which are operated by the CLO-36 relay and transfer the last resistor 212 from arm 207 to arm 205.

A second plurality of resistors 216, one for each of the ninety-six trunks, are normally connected in series in arm 208 of the bridge but are each capable of being inserted in series with arm 206 upon the operation of associated relay contacts. Thus the contacts within dashed rectangle 217 are operated by A-1 relay 140 and serve, by means of the transfer contacts illustrated, to transfer the first resistor 216 from arm 208 to arm 206 and to substitute a direct connection in arm 208. Similarly, the transfer contacts within dashed rectangle 218 are operated by A-2 relay 150 and transfer the second resistor 216 from arm 208 to arm 206, and so forth, to the transfer contacts within dashed rectangle 219 which are operated by the A-96 relay and transfer the last resistor 216 from arm 208 to arm 206. The 37th through 96th A relays are represented by the circuit of FIG. 13. The first twenty-six A relays are shown in FIG. 10.

Each of the resistors 216 has been arbitrarily assigned a value of one hundred ohms. This resistance value therefore represents, in the bridge, one trunk. Each of the resistors 212 has been assigned a value of 250 ohms and this resistance value represents one channel. The relative weight given to the trunks and channels in the bridge circuit is therefore 2.5:1 (250/100). This ratio corresponds to the trunk-channel removal ratio which the bridge is designed to maintain.

The failure of a channel, channel 1, for example, as described above, results in one of the 250 ohm resistors 212 being transferred to arm 205 by the operation of the appropriate CLO relay. This transfer unbalances the bridge and establishes a potential drop from the junction of arms 205 and 207 and the junction of arms 206 and 208. Connected between these two junction points are two relays, Deduct Trunks (DT) relay 220 and Increase Trunks (IT) relay 221. Diodes 222 and 223 are connected in series with DT relay 220 and IT relay 221, respectively, with opposite polarity to confine the current flow in each of these relays to one direction only.

It can be seen that the transfer of one of the resistors 212 to arm 205 lowers the potential at the junction of arms 205 and 207. Current will therefore flow through DT relay 220 and operate this relay. In order to rebalance the bridge and release DT relay 220, it is necessary to transfer some of the resistors 216 from arm 208 to arm 206. The circuit means for accomplishing this is disclosed in FIG. 17 and will be described hereafter.

It will be noted that, for each locked out channel which causes one of resistors 212 to be transferred, it is necessary to transfer 2.5 resistors 216. Since these resistors are indivisible, however, any odd number of locked out channels could not be perfectly balanced by the transfer of resistors 216. The "odd-even" circuit of FIG. 16 has been provided for this contingency.

Figure 16:
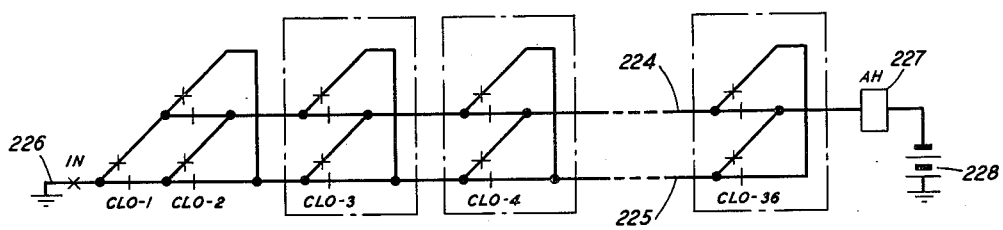

In FIG. 16 there are shown two busses, 224 and 225. With none of the CLO relays operated, conductor 225 is connected through the CLO break contacts shown and IN make contact 226 to ground. If an odd number of CLO relays are operated, the transfer contacts illustrated transfer this ground to conductor 224. If an even number of CLO relays are operated, this ground is again transferred back to conductor 225. An Add Half (AH) relay 227 is connected between the conductor 224 and battery 228. Hence, if ground is present on conductor 224, AH relay 227 will operate. The operation of this relay therefore indicates the operation of an odd number of CLO relays. If ground is present on conductor 225 and not on conductor 224, AH relay 227 will release, indicating the operation of none or an even number of CLO relays.

When AH relay 227 operates, indicating an odd number of operated CLO relays, the AH transfer contacts within dashed rectangle 229 in FIG. 15 will transfer a 50 ohm resistor 230 from arm 207 to arm 205. This 50 ohm resistor 230 will bring the total resistance in arm 205 when an odd number of CLO relays are operated to the next highest even hundred ohms and permit substantially perfect balance by the 100 ohm resistors 216 in arm 208.

Continuing the assumption that CLO-1 relay 147 has been operated by a channel failure, the trunk cut-off circuit of FIG. 17 will now be considered. It will be recalled that one 250 ohm resistor 212 and the 50 ohm resistor 230 in FIG. 15 have been transferred to unbalance the bridge by 300 ohms. In FIG. 17, ground from bus 231 is applied through IN make contact 232 and DT make contact 233 to dashed rectangle 234. Dashed rectangle 234 contains the necessary circuitry for cutting off the ninety-sixth trunk. Similarly, dashed rectangle 235 contains the circuits to cut off the ninety-fifth trunk, dashed rectangle 236 the circuits to cut off the ninety-fourth trunk, and so forth, to dashed rectangle 237 which contains the circuits to cut off the first trunk. The details of one of these cut-off circuits will now be examined.

The ground supplied by DT make contact 233 is applied first to the I-96 transfer contacts 238. If the ninety-sixth trunk is already cut off, the CO-96 relay will be operated to operate the I-96 relay in the manner illustrated in FIG. 4 for I-1 relay 129 (CO-1 make contact 265). I-96 transfer contacts 238 will therefore be operated and ground from DT make contact 233 will be applied to dashed rectangle 235. It will be remembered, however, that if the CO-96 relay is already operated, the A-96 relay will also have been operated in the manner shown for the A-37 relay 239 in FIG. 13 (CO-37 make contact 266) and the A-1 relay 140 in FIG. 10 (CO-1 make contact 138). One of the 100 ohm resistors 216 in the bridge of FIG. 15 will therefore have already been transferred and the bridge will be that much less out of balance.

If the I-96 relay is not operated, ground from DT make contact 233 is applied to TB-96 transfer contacts 240. As can be seen in FIG. 14, the TB relays are operated by the insertion of an incoming telephone trunk 241 into a station jack 242 at the toll switchboard. As illustrated from trunk number one, the insertion of this trunk into the station jack 242 connects spring contact 243 to sleeve 244 and thereby operates TB-1 relay 245 from battery 246 to ground bus 247. The operation of any one of the ninety-six TB relays indicates that the corresponding incoming trunk circuit is connected to the associated TASI trunk at the toll switchboard.

Returning to FIG. 17, the operation of TB-96 transfer contacts 240, indicating that this trunk is "busy," i.e., has an incoming trunk connected thereto, transfers the ground from DT make contact 233 through the normally closed portion of BC transfer contacts 248 to dashed rectangle 235. Hence nothing occurs with respect to trunk ninety-six at this time if the trunk is busy.

If the trunk is not busy, i.e. if no incoming line is connected to the trunk and the TB-96 relay is not operated, ground is applied from DT make contact 233 through the normally closed portion of CO-96 transfer contacts 249 to CO-96 relay winding 250. CO-96 relay 250 operates from battery 251 to this ground and locks through CO-96 transfer contacts 249 to conductor 252. Conductor 252 is locked to ground bus 231 through IT break contact 253 and IN make contact 254, or through one of the CO transfer contacts 255.

The operation of CO-96 relay 250 operates the I-96 relay, as shown in FIG. 4, and the A-96 relay, as shown in FIG. 13. The closing of these two relays closes an A-96 make contact similar to A-1 make contact 256 and an I-96 make contact similar to I-1 make contact 257 in FIG. 14. A "Trunk Locked Out" (TLO) lamp similar to TLO-1 lamp 258 lights at the appropriate station of the toll switchboard from battery 246 to ground bus 247. This lamp signifies to the attendant operator that service will not be provided through this station and that any incoming trunk plugged into this station jack should be removed and no new trunks should be plugged in. As discussed with respect to FIG. 6, the operation of the A and I relays serve to artificially mark the trunk as inactive and thus deny it service by the TASI equipment.

The operation of the A-96 relay as described above transfers one of resistors 216 in FIG. 15 from arm 208 to arm 206 and partially restores balance. Since 300 ohms have been transferred in the channel lock-out portion of the bridge, however, balance is not yet obtained.

Returning to FIG. 17, the operation of the I-96 relay operates I-96 transfer contacts 238 and transfers the ground at DT make contact 233 to dashed rectangle 235. In dashed rectangle 235 a sequence similar to that described with reference to dashed rectangle 234 takes place. That is, the circuit is first tested at I-95 transfer contacts 259 to determine whether the trunk is already cut off. If it is, I-95 transfer contacts 259 are operated and ground is passed on to the next cut-off circuit 236. If it is not, the trunk is tested at TB-95 transfer contacts 260 to see if the trunk is actually busy. If it is, TB-95 transfer contacts 260 are operated and ground is passed on through the normally closed portion of BC transfer contacts 261 to the next cut-off circuit 236. If it is not, CO-95 relay 262 is operated through the normally closed portion of CO-95 transfer contacts 263 and locks through these transfer contacts to conductor 252. Following the operation of CO-95 relay 262, a sequence similar to that in the case of CO-96 relay 250 takes place: (1) the A-95 and I-95 relays operate (2) the TLO-95 lamp lights to signal the toll switchboard operator (3) the speech detector of the 95th trunk is marked as inactive (4) another 100 ohm resistor 216 is transferred in the bridge circuit; and (5) the I-95 transfer contacts 259 transfer ground on to the next cut-off circuit 236.

The same sequence is repeated for each trunk until the necessary number of trunks are locked out to restore balance in the bridge circuit of FIG. 15. When balance is restored, DT relay 220 releases and disables the cut-off circuits of FIG. 17 at DT make contact 233. The CO relays which have operated remain locked through the CO transfer contacts 263 to bus 252.

It can be seen that the circuit of FIG. 17 has thus far operated to lock out only those trunks which are not connected to an outside circuit, i.e., only trunks which are not busy. Normally a sufficient number of such idle trunks are available to restore balance immediately. If there is not a sufficient number of idle trunks to restore balance, DT make contact 233 will remain closed. The circuit will then wait until a trunk does become idle, i.e., the conversation is completed on that trunk and the incoming trunk is removed from the station jack. The appropriate CO relay will then operate through the TB transfer contacts similar to TB-95 transfer contacts 260 and the idle trunk will be locked out. In any case, eventually balance will be restored and the circuit of FIG. 17 disabled.

It will be noted that, in the case of single channel failures, only idle trunks are cut off to obtain the desired trunk-channel cut-off ratio. Since these failures will normally take place one at a time, finding the required idle trunks to restore balance will not be unduly delayed. Since the failed channel is no longer being used for transmission, testing and repairs may take place on this channel while the remainder of the system continues to operate. When the repairs that are necessary are ultimately made, a normally closed Restore Channel (RC) key similar to RC key 264 in FIG. 11 is operated to release the associated CLO relay.

The release of the CLO relay transfers the associated one of resistors 212 in the bridge circuit of FIG. 15 back to arm 207. This unbalances the bridge in the reverse direction and causes IT relay 221 to operate and open IT break contact 253 in FIG. 17. Assuming the CO-1 relay 262″ has been operated in the cut-off sequence, the opening of IT break contact 253 removes the locking ground from this relay and the relay releases. The associated A and I relays also release to re-enable the speech detector, extinguish the TLO lamp signal, and transfer one of the 100 ohm resistors 216 in FIG. 15 back to arm 208. CO-1 transfer contacts 255″ therefore operate to remove ground from the next operated CO relay. This process continues until balance is again restored in the bridge circuit and IT relay 221 releases. The circuits then restore to normal to await the next channel failure.

It can be seen that the above-described circuits serve to automatically remove and restore trunks and channels at a ratio of 2.5:1 in the event of individual channel failures. This is accomplished by removing from service a sufficient number of idle trunks to obtain this ratio after the channel failure. These idle trunks are restored to service when the failure in the channel is corrected.

As shown in FIG. 17, the cut-off of idle trunks begins with the ninety-sixth trunk and proceeds down to the first trunk. The first trunk is given the highest priority of service and the last or ninety-sixth trunk is given the lowest priority of service. It is therefore possible to assign the most vital conversations to the lowest numbered available trunk and be virtually assured of continuous service in the event of channel failures.

It will be noted that the circuits of FIGS. 15, 16 and 17 are enabled only when IN relay 110 is operated to close IN make contacts 211, 226, 232 and 254, respectively. These circuits are therefore disabled when ever the TASI facilities are not in actual use. Furthermore, these circuits are disabled during the entire switch-in preparation where the trunk-channel association cycles would otherwise systematically unbalance the bridge circuit.

The above trunk-channel balance circuits are suitable for single channel failures or relatively few simultaneous channel failures. It is apparent, however, that a failure in the channel group modulating or demodulating equipment could result in the loss of an entire group of twelve channels. If it is necessary to await the appearance of idle trunks to restore such a large unbalance, all of the conversations would, in the meantime, be very badly degraded and perhaps even become unintelligible. It therefore appears that a separate procedure must be available in the case of group failures. Such a procedure will now be described.

*Channel group failures*

As shown in FIG. 1, channel group failures are reported to the TASI Control circuit 31 on line 49 from group pilot detecting circuit 48. As described, these failures may be detected by group pilot signal failures on any one of the three channel groups. These failures are reported by a ground condition on any one of three separate leads, one for each twelve-channel group.

In FIG. 12 these three leads are shown at 300, 301 and 302. The ground appearing on the one of these leads corresponding to the group failure operates the connected one of Group Failure (GF) relays 303, 304, or 305 from battery 306. As illustrated in FIG. 11 for CLO-1 relay 147, each of the CLO relays may be operated to a ground bus 307 through a GF make contact similar to GF-1 make contact 308. In fact, CLO-1 through CLO-12 relays are operated by GF-1 make contacts, CLO-13 through CLO-24 relays are operated by GF-2 make contacts and CLO-25 through CLO-36 relays are operated by GF-3 make contacts. The CLO relays thus operated by GF make contacts, of course, correspond to the actual channels included in the respective channel groups.

The operation of one of the GF relays 303, 304, or 305 in FIG. 11 therefore operates a corresponding twelve of the CLO relays. In FIG. 15, these twelve CLO relays transfer twelve of resistors 212 from arm 207 of the bridge to arm 205, thus unbalancing the bridge by 3000 ohms (12×250). Normally, this would require the cut-off of thirty trunks to restore balance.

As described with reference to single channel failures, the trunk cut-off circuit of FIG. 17 immediately attempts to obtain balance by cutting off idle trunks. Since there is a good probability that there will not be thirty idle trunks available, the ground supplied by DT make contact 233 eventually is applied by way of the I and TB transfer contacts illustrated to operate Idle Cut-off Complete (ICC) relay 309. ICC relay 309 operates ICC make contact 310 to short out its lower winding and make it slow to release. ICC relay 309 also closes ICC make contact 311 to lock through DT make contact 312 or BC make contact 313 to ground bus 231.

If there are thirty idle trunks available, DT relay 220 will release and open DT make contact 233 before ICC relay 309 is operated. The bridge circuit of FIG. 15 will then be in balance and the trunk cut-off circuit of FIG. 17 will therefore restore to normal.

If ICC relay 309 does operate, it will close ICC make contact 314 to operate Busy Cut-off (BC) relay 315 in FIG. 18 from battery 316 through one of the GF make contacts 317, 318 or 319 and through BCC break contact 320 to ground bus 321. BC relay 315, when operated, transfers an 800 ohm resistor 322, by means of BC transfer contacts within dashed rectangle 323, from arm 208 to arm 206 of the bridge circuit in FIG. 15. This 800 ohm resistor 322 is equivalent to eight cut-off trunks and its purpose will be described hereafter.

In FIG. 17, BC relay 315 operates BC transfer contacts 248, 261, 261', . . . 261" to by-pass the TB transfer contacts 240, 260, 260', . . . 260", respectively, and thus allow the CO relays of busy trunks to be operated. These CO relays operate one at a time from the ground provided at DT make contact 233 and, when operated, operate an associated I relay to pass the ground along to the next trunk cut-off circuit. This cut-off of busy trunks will continue until balance is restored in the bridge circuit of FIG. 15, and DT relay 220 releases to remove the operating ground at DT make contact 233. Each CO relay thus operated also locks through the CO transfer contacts 255, 255', . . . 255" of the preceding CO relay to ground bus 231.

The 800 ohm resistor 322 inserted in arm 206 of the bridge circuit of FIG. 15 causes the bridge to balance before the actual trunk channel cut-off ratio of 2.5 is obtained. Since, in the case of a channel group failure, a very large number of trunks will be interpolated on a relatively small number of channels, the resulting freezeout degradation may become intolerable. Rather than allow this situation to continue, it is preferable to cut off busy trunks until the freeze-out degradation falls to a level where speech is at least intelligible. It is not necessary, however, to restore the high quality of speech available when a trunk channel cut-off ratio of 2.5 is used, especially when this high quality of speech would be obtained by cutting off trunks in the middle of conversations. Resistor 322 in FIG. 15 comprises between these two extremes by permitting busy cut-off to continue only until the number of trunks required to obtain the 2.5:1 ratio, less eight, are cut off. This artificial balance at a cut-off ratio greater than the 2.5:1 cut-off ratio causes a sufficient number of busy trunks to be cut off to render the speech on the remaining trunks intelligible, but does not allow the cut-off of busy trunks to continue beyond this point.

When a sufficient number of busy trunks have been cut off to obtain this artificial balance, DT relay 220 in in FIG. 15 releases and closes DT break contact 324 in FIG. 19. Busy Cut-off Complete (BCC) relay 325 operates from battery 326 through ICC make contact 327, BC make contact 328 and DT break contact 324 to ground bus 329. BCC relay 325 locks through BCC make contact 330 to ground bus 329.

The operation of BCC relay 325 opens BCC break contact 320 in FIG. 18 and thereby releases BC relay 315. The 800 ohm resistor 322 in the bridge circuit of FIG. 15 is therefore restored to arm 208 and the bridge again goes out of balance, operating DT relay 220, and energizing the trunk cut-off circuit of FIG. 17. The BC transfer contacts 248, 261, 261' . . ., 261" have in the meantime fallen back and hence cut off of busy trunks is prevented at this time. As the trunks remaining in service become idle, however, they are cut off individually as described with reference to single channel failures until a true balance is obtained.

It should be mentioned that when BCC relay 325 releases at the end of the busy cut-off cycle and releases BC relay 315, the locking path for ICC relay 309 is momentarily interrupted until DT relay 220 again operates. Since ICC relay 309 has a slow release feature, however, it holds over this momentary interruption of its locking paths.

The cut-off sequence which takes place when a channel group failure occurs is summarized in the sequence chart of FIG. 21. A group failure operates one of the GF relays (GF–a relay) causing the associated twelve CLO relays to operate. This unbalances the bridge in FIG. 15 and causes DT relay 220 to operate and enable the truck cut-off circuits of FIG. 17. An idle trunk cut-off cycle then takes place which successively cuts off all of the idle trunks and operates ICC relay 309. ICC relay 309 operating causes BC relay 315 to operate to insert the 800 ohm resistor 322 in the cut-off arm 206 of the bridge circuit of FIG. 15 to simulate eight cut-off trunks. A busy cut-off cycle follows in which busy trunks are cut off until balance is restored. At this time, DT relay 220 releases to operate BCC relay 325 and thereby release BC relay 315. The 800 ohm resistor is therefore transferred back to arm 208 of the bridge circuit and the bridge again becomes unbalanced to operate DT relay 220. Another idle trunk cut-off cycle follows in which trunks are cut off as they become idle until balance is restored.

When balance is then restored, DT relay 220 in FIG. 15 again releases and opens DT make contact 312 in the ICC locking circuit. After the release time of ICC relay 309, this relay releases and opens ICC make contact 327 in FIG. 19. BCC relay 325 is thereby released and the circuits of FIGS. 18 and 19 restored to normal.

The TASI equipment continues to interpolate the speech of the operative trunks on the remaining twenty-four channels until repairs have been effected in the channel group equipment. When this equipment is restored to operation, the group pilot signal is again received by the detecting circuits 48 in FIG. 1 and ground is removed from the appropriate one of GF leads 300, 301, or 302 (FIG. 12). The connected GF relay therefore releases, removing ground from the corresponding twelve CLO relays (FIG. 11). When these CLO relays release, they transfer the resistors 212 in the bridge circuit of FIG. 15 back to arm 207. The bridge is therefore unbalanced so as to operate IT relay 221. IT break contact 253 in FIG. 17 therefore opens, removing ground from the first one of the operated CO relays. This CO relay releases, transferring the CO transfer contacts 255 and removing ground from the next operated CO relay. This process continues until all of the locked out trunks are restored to operation and the bridge again becomes balanced. IT relay 221 then releases, restoring the cut-off circuits of FIG. 17 to normal and allowing speech interpolation from all of the trunks to all of the channels.

It can be seen that the relay control circuits heretofore described allow a systematic programming of the TASI equipment prior to switch-in, automatically control the switch-in sequence, and automatically maintain the most advantageous trunk-channel ratio in the case of channel failures. All of these functions are performed simultaneously at both ends of the communication system to keep the transmitting and receiving channels in balance. Furthermore, these functions permit detailed control over all of the possible trunk-channel relationships involved.

It is possible, for example, to bridge special calls around the TASI equipment simply by manually operating the associated CLO and CO relays and bridging the call from a trunk to a channel. In this way, the special call would not be subject to any of the freeze-out degradation introduced by the TASI equipment and furthermore, would continually be assured of a unique transmission channel for the duration of the conversation.

It is to be understood that the above-described arrangements are merely illustrative of one of the many possible embodiments which can represent applications of the principles of the invention. Numerous and varied other arrangements in accordance with these principles may readily be devised by those skilled in the art without departing from the spirit or the the scope of the invention.

What is claimed is:

1. A line control circuit for a time assignment speech interpolation system wherein active ones of a plurality of telephone trunks are connected to idle ones of a lesser plurality of transmission channels on a time division basis, said line control circuit comprising first means for registering the number of failed channels, a normally balanced bridge circuit, means responsive to said first registering means for inserting a first impedance in one arm of said bridge circuit proportional to the number of failed channels, means for detecting balance in said bridge circuit, means responsive to said balance detecting means for adjusting the number of operative trunks, second means for registering the number of operative trunks, and means responsive to said second registering means for inserting a second impedance in another arm of said bridge circuit proportional to the number of inoperative trunks.

2. The line control circuit according to claim 1 including means for adjusting said first and second impedances in increments, the increments in said first and second impedances having a ratio greater than one.

3. The line control circuit according to claim 1 further including means for programming said time assignment speech interpolation system, said programming means comprising means for marking all of said trunks as active, means for marking all of said channels as unavailable, means for disabling said trunk marking means for each of said trunks in succession, and means for disabling said channel marking means for each of said trunks in succession and immediately following the disablement of said trunk marking means for a corresponding one of said trunks.

4. The line control circuit according to claim 1 further including means for enabling said adjusting means only for unused trunks.

5. The line control circuit according to claim 4 further including means for enabling said adjusting means for trunks in use after all unused trunks have been rendered inoperative.

6. The line control circuit according to claim 1 further including means for automatically inserting a fixed impedance in said other arm of said bridge circuit in response to said first registering means registering a number of failed channels greater than a preselected number.

7. In a time assignment speech interpolation system for connecting active ones of a plurality of voice signal trunks to idle ones of a lesser plurality of voice transmission channels on a time division basis, means for maintaining a preselected cut-off ratio between disablements in said trunks and failures in said channels, said ratio maintaining means comprising means for detecting failures in said channels, a normally balanced bridge circuit, means responsive to said failure detecting means for selectively unbalancing said bridge circuit in proportion to the number of said failures, means responsive to unbalances in said bridge circuit for cutting off said trunks one at a time, and means responsive to each trunk cut-off for reducing the unbalance of said bridge circuit in a fixed increment proportional to said preselected ratio.

8. The combination according to claim 7 wherein said trunk cut-off means comprises means for cutting off only idle ones of said trunks before cutting off any active ones of said trunks.

9. The combination according to claim 7 further including means for partially restoring balance in said bridge circuit before cutting off any active ones of said trunks.

10. In a traffic control system in which a plurality of items of a first class utilizes a lesser plurality of items in a second class on a time division basis, automatic means for maintaining a preselected ratio between the number of items removed from said first and second classes, said ratio maintaining means comprising means responsive to a decrease in the number of items in one of said classes for generating a signal indicative of said decrease, means responsive to said signal for reducing the number of items in the other of said classes, means for detecting the ratio between the number of items removed from first and second classes, and means for disabling said adjusting means when said preselected ratio is detected.

11. The combination according to claim 10 further including means for automatically increasing said preselected ratio in response to a decrease in the number of items in said one class exceeding a given number.

12. A balanced line concentrator comprising a plurality of input lines, a lesser plurality of output lines, switching means for connecting active ones of said input lines to idle ones of said output lines, means for detecting transmission faliures in each of said output lines, normally balanced bridge circuit means, means responsive to said failure detecting means for unbalancing said bridge circuit means in proportion to the number of said failures, means for detecting balance in said bridge circuit means, means responsive to said balance detecting means for cutting off said input lines one by one when an unbalance occurs, and means responsive to said cut-off means for partially rebalancing said bridge circuit means for each of said input lines cut off.

13. In a time assignment speech interpolation system having a plurality of input lines and a lesser plurality of output lines, means for registering the number of failures in said output lines, means responsive to said registering means for generating a signal proportional to the number of said failures, means responsive to said signal generating means for disconnecting selected ones of said input lines from said speech interpolation system, and means for disabling said disconnecting means when the ratio between the number of disconnected input lines and the number of failed output lines reaches a preselected value.

14. In the speech interpolation system according to claim 13, disconnecting means comprising means for disconnecting only idle ones of said input lines until all said idle input lines are disconnected, and means for disconnecting busy ones of said input lines thereafter.

15. A switching control circuit comprising a plurality of voice signal lines, a lesser plurality of transmission channels, time assignment speech interpolation means for connecting active ones of said voice signal lines to idle ones of said transmission channels on a time division basis, means for determining individual and group failures on said transmission channels, a normally balanced bridge circuit, means responsive to said failure determining means for selectively unbalancing said bridge circuit in proportion to said failures, means responsive to unbalances in said bridge circuit for automatically reducing the number of available voice signal lines, and means responsive to said automatic reducing means for reducing the unbalance in said bridge circuit in fixed increments proportional to a preselected ratio.

16. A line control circuit for a time assignment speech interpolation system wherein active ones of a plurality of telephone trunks are connected to inactive ones of a lesser plurality of transmission channels on a time division basis, said line control circuit comprising means for detecting failures in said transmission channels, means responsive to said failure detecting means for registering the total number of said failures, means for registering the total number of inoperative telephone trunks, means responsive to said trunk and channel registering means for detecting the ratio between failed transmission channels and inoperative telephone trunks, and means responsive to said ratio detecting means for adjusting the number of operative telephone trunks to provide a preselected value for said ratio.

References Cited in the file of this patent

UNITED STATES PATENTS 2,307,896    Neiswinter et al.          Jan. 12, 1943
2,745,067    True et al.               May 8, 1956